US006678394B1

(12) United States Patent
Nichani

(10) Patent No.: US 6,678,394 B1
(45) Date of Patent: Jan. 13, 2004

(54) OBSTACLE DETECTION SYSTEM

(75) Inventor: Sanjay Nichani, Natick, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 0 days.

(21) Appl. No.: 09/450,570

(22) Filed: Nov. 30, 1999

(51) Int. Cl.[7] .............................................. G06K 9/00
(52) U.S. Cl. ...................................... 382/103; 348/169
(58) Field of Search ................................ 382/154, 285, 382/103, 104; 348/584, 169, 148; 73/146; 345/419

(56) References Cited

U.S. PATENT DOCUMENTS

| | | | |
|---|---|---|---|
| 4,970,653 A | 11/1990 | Kenue | 364/461 |
| 5,075,864 A | 12/1991 | Sakai | 364/450 |
| 5,208,750 A | 5/1993 | Kurami et al. | 364/424 |
| 5,301,115 A | 4/1994 | Nouso | 364/460 |
| 5,410,346 A * | 4/1995 | Saneyoshi et al. | 348/116 |
| 5,529,138 A | 6/1996 | Shaw et al. | 180/169 |
| 5,555,312 A | 9/1996 | Shima et al. | 382/104 |
| 5,581,250 A | 12/1996 | Khvilivitzky | 340/961 |
| 5,642,106 A | 6/1997 | Hancock et al. | 340/988 |
| 5,706,355 A | 1/1998 | Raboisson et al. | 382/104 |
| 5,880,362 A * | 3/1999 | Tang et al. | 73/146 |
| 5,917,937 A | 6/1999 | Szeliski et al. | 382/154 |
| 5,961,571 A | 10/1999 | Gorr et al. | 701/207 |
| 6,081,273 A * | 6/2000 | Weng et al. | 345/420 |
| 6,236,412 B1 * | 5/2001 | Ojima | 345/474 |

OTHER PUBLICATIONS

Abstract of U.S. Pat. No. 3,686,434, Lemelson, Sep. 22, 1972.
Abstract of U.S. Pat. No. 3,816,648, Noll et al., Jun. 11, 1974.
Abstract of U.S. Pat. No. 3,858,043, Sick et al., Dec. 31, 1974.
Abstract of U.S. Pat. No. 4,198,653, Kamin, Apr. 15, 1980.
Abstract of U.S. Pat. No. 4,458,266, Mahoney, Jul. 3, 1984.
Abstract of U.S. Pat. No. 5,245,422, Borcherts et al., Sep. 14, 1993.

(List continued on next page.)

Primary Examiner—Leo Boudreau
Assistant Examiner—Tom Y. Lu
(74) Attorney, Agent, or Firm—Brian Michaelis

(57) ABSTRACT

A three-dimensional (3-D) machine-vision obstacle detection solution involving a method and apparatus for performing high-integrity, high efficiency machine vision. The machine vision obstacle detection solution converts two-dimensional video pixel data into 3-D point data that is used for calculation of the closest distance from the vehicle to points on the 3-D objects, for any object within view of at least one imaging device configured to provide obstacle detection. The obstacle detection apparatus includes an image acquisition device arranged to view a monitored scene stereoscopically and pass the resulting multiple video output signals to a computer for further processing. The multiple video output signals are connected to the input of a video processor adapted to accept the video signals. Video images from each camera are then synchronously sampled, captured, and stored in a memory associated with a general purpose processor. The digitized image in the form of pixel information can then be retrieved, manipulated and otherwise processed in accordance with capabilities of the vision system. The machine vision obstacle detection method and apparatus involves two phases of operation: training and run-time. Training is a series of steps in which 3-D image data and other 3-D data are combined into a 3-D model of a vehicle being navigated. During run-time, the entities observed and optionally segmented objects from a camera on the vehicle are compared against the model to detect obstacles and their relative position and trajectory.

19 Claims, 5 Drawing Sheets

OTHER PUBLICATIONS

Abstract of U.S. Pat. No. 5,528,703, Lee, Jun. 18, 1996.
Abstract of U.S. Pat. No. 5,577,130, Wu, Nov. 19, 1996.
Abstract of U.S. Pat. No. 5,579,444, Dalziel et al., Nov. 26, 1996.
Abstract of U.S. Pat. No. 5,589,928, Babbitt et al., Dec. 31, 1996.
Abstract of U.S. Pat. No. 5,734,336, Smithline, Mar. 31, 1998.
Abstract of U.S. Pat. No. 5,832,134, Aviaash et al., Nov. 3, 1998.
Abstract of U.S. Pat. No. 5,870,220, Migdal et al., Feb. 9, 1999.
Abstract of U.S. Pat. No. 5,917,936, Katto, Jun. 29, 1999.
Abstract of U.S. Pat. No. 5,974,192, Kundu, Oct. 26, 1999.
Umesh R. Dhond et al., *IEEE Transactions on Pattern Analysis and Machine Intelligence*, "Stereo Matching in the Presence of Narrow Occluding Objects Using Dynamic Disparity Search", vol. 17, No. 7, Jul. 1995, one page.
*Scientific Technologies Inc.*, "Theory of Operation and Terminology", pp. A50–A54.
*Scientific Technologies Inc.*, "Safety Strategy", pp. A24–A30.
*Scientific Technologies Inc.*, "Safety Standards for Light Curtains" pp. A14–A15.
Web document, "PLS Proximity Laser Scanner Applications", web site: www.sickoptic.com/safapp.htm, picked as of Nov. 4, 1999, 3 pages.

Web document, "New Dimensions in Safeguarding", web site: www.sickoptic.com/plsscan.htm, picked as of Nov. 3, 1999, 3 pages.

Web document, "Special Features", web site: www.sickoptic.com/msl.htm, picked as of Nov. 3, 1999, 3 pages.

Web document, "Capacitive Proximity Sensors", web site: www.theproductfinder.com/sensors/cappro.htm, picked as of Nov. 3, 1999, one page.

Web document, "The Safety Light Curtain", web site: www.theproductfinder.com/sensors/saflig.htm, picked as of Nov. 3, 1999, one page.

Web document, "WV 601 TV/FM", web site: www.leadtek.com/wv601.htm, picked as of Nov. 9, 1999, 3 pages.

Web document, "Product Information", web site: www.imagraph.com/products/IMAproducts–ie4.htm, picked as of Nov. 9, 1999, one page.

Web document, "FlashPoint 128", web site: www.integraltech.com/128OV.htm, picked as of Nov. 9, 1999, 2 pages.

Web document, "Compatible Frame Grabber List", web site: www.masdkodak.com/frmegrbr.htm, picked as of Nov. 9, 1999, 6 pages.

* cited by examiner

OBSTACLE DETECTION SYSTEM

FIELD OF THE INVENTION

The present invention relates to obstacle detection in mobile systems, and more particularly to an automated system for observing objects an area near a mobile system.

BACKGROUND OF THE INVENTION

Vehicle collision avoidance requires detection of nearby objects. In many cases the obstacles can be avoided by automatically stopping the vehicle, changing direction, or warning the operator when dangerous circumstances are observed. A person or object located in or approaching the vehicle's path may create dangerous conditions. Other obstacles include mechanical objects, holes in a travel surface, road boundaries, low bridges, and other conditions that can harm the vehicle, its load, or its occupants. Since obstacles encountered as a vehicle travels have different surface characteristics (reflectance, density, etc), robust detection can require numerous simultaneous safeguards, increasing system costs, and reducing reliability and flexibility of the vehicle.

Sensor technologies can be generally divided into two categories: active and passive. Active sensors insert or emit something into the area under test, and measure the response, or changes. Most lasers, radar, and ultrasonic sensors typically fall within this category. Passive sensors typically do not emit things into an area, rather they typically remain stationary and are activated by objects engaging/contacting the sensor or transducer. Mechanical probes, switches and camera-based systems typically fall within this category. In many applications, active sensors cannot be used for one reason or another, and passive sensors may provide superior capabilities in such cases. For example, when vehicles are operating in the same area using active sensor technologies such as laser, radar, or ultrasonic, the sensory emissions from other vehicles can be misinterpreted by receivers as reflections from objects and cause dangerous confusion.

Mechanical switches, photo-optical sensors and other proximity or motion sensors are well known safety and security components used in obstacle detection. These types of protection have the general disadvantage of being very limited in ability to detect more than a simple presence or absence (or motion) of an object, person, or other obstacle. In addition, simple sensors are typically custom specified or designed for the particular vehicle and the area to be navigated based upon a limited set of hazards. Mechanical sensors, in particular, have the disadvantage of being activated by unidirectional touching, and they must often be specifically designed for that unique purpose. They cannot sense any other types of collision, nor sense objects approaching nearby, nor objects arriving from an unpredicted direction. For example, a sensor lever on the front of a vehicle, resting on the ground, can sense a hole or other drop-off, but only at the location of the sensor. At higher vehicle speeds, sensing may occur too late for taking evasive actions. Even complicated combinations of motion and touch sensors can offer only limited and inflexible obstacle detection for circumstances in which one type of obstacle in the area should be ignored, and another type should result in evasive actions.

Ultrasonic sensor technologies are also available, based upon emission and reception of sound energy at frequencies beyond human hearing range. Ultrasonic sensing depends upon the hardness or density of an object, i.e., its ability to reflect sound. This makes ultrasonic sensors practical in some limited cases. Most significantly, like many simple mechanical sensors, the disadvantages of ultrasonic sensors include that they produce only a binary result, i.e., whether or not the vehicle has approached too close to an obstacle. Similar problems exist for known passive infra-red sensors, which can only detect the binary presence or absence of an object radiating heat, or more precisely, a change in the heat profile within the viewed scene. Each of these types of sensor is also susceptible to interference by emissions from other systems operating in the same general area.

Proximity laser scanners (PLS) can also be used to detect obstacles within a defined area near the PLS sensor. These systems are also known as Laser Measurement Systems (LMS). The PLS technology uses a scanning laser beam and measures the time-of-flight for reflected light to determine the position of objects within the viewing field. A relatively large zone, e.g., 50 meter radius over 180 degrees, can be scanned and computationally divided into smaller zones for early evasive actions or for emergency stops. However, like many of the other sensor technologies, the scanning laser systems typically cannot distinguish between different sizes or characteristics of obstacles detected, making them unsuitable for many collision avoidance applications. Significantly, the scanning laser systems typically incorporate moving parts, e.g., for changing the angle of a mirror used to direct the laser beam. Such moving parts experience wear, require precision alignment, are extremely fragile and are thus unreliable under challenging ambient conditions. Also, the PLS cannot discriminate between multiple obstacles and a single obstacle in the same location. Nor can such systems detect the orientation and direction of the obstacle within the area being monitored. Thus, an object moving across the path of the vehicle might raise the same alarm as a fixed obstacle at the same location toward which the vehicle is moving, causing a false alarm in the PLS.

The use of radar systems for collision avoidance is well known in the art. For example, U.S. Pat. No. 4,403,220 issued Sep. 6, 1983 discloses a radar system for collision avoidance in marine ships and aircraft. The system uses oscillating radar antennas and detects Doppler shift (relative speed) and direction of returned radio frequency pulses, and is specifically adapted for avoiding collisions. Similarly, U.S. Pat. No. 4,072,945 issued Feb. 7, 1978 discloses a collision avoidance system for motor vehicles using radar. The major disadvantage of using microwave radar devices is that physical constraints on the maximum antenna size generally result in a system having a relatively large minimum beam width. Given a wide beam, e.g., three degrees, the scanned area at a reasonable distance is much too broad to provide a useful result with any precision. Therefore, rather than limiting the detection field to obstacles in front of the vehicle, such systems also detect nearby objects that present no threat to the vehicle, such as road signs, trees, and bridges, generating false alarms. Another disadvantage of radar-based systems is that they have trouble discriminating among radar signals that emanate from other nearby vehicles that are using similar equipment, and other ambient interference. Furthermore, the requirement for precision calibration of moving parts makes the systems inherently unreliable in the presence of hostile environmental conditions, thus increasing operating and maintenance costs. Ultrasonic ranging and detecting equipment has similar disadvantages, to an even larger extent than radar, thus limiting such solutions to detection of objects that are very close to the sensor.

A "laser radar" system, such as that disclosed in U.S. Pat. No. 5,529,138 issued Jun. 25, 1996, teaches the use of a laser beam system on a vehicle for detecting obstacles. The system uses directed laser beams and reflection sensors to sense the relative location and speed of obstacles, estimate the size of an obstacle, and its relative direction of movement. Coupled with a speedometer input, the system can also estimate the ground speed of the obstacle. There are several disadvantages of laser radar systems. One major disadvantage is that a laser radar system can only detect its own reflected signal (ignoring interference) which is, by its very nature, a narrow beam. Even with an array of multiple lasers, each unit can only detect reflections from the narrow area being scanned by the beam. Also, mechanical mirrors are used for directing the laser beam, and this introduces the inherent unreliability and higher maintenance needs required for moving parts. The mirrors or other moving parts require precision calibration, thus reducing their utility in hostile ambient conditions such as shock, vibration, and wide temperature ranges. Furthermore, it is well known that adverse weather conditions, such as rain, fog, snow, and other high-humidity conditions increase the attenuation of infra-red laser beams.

Primitive vision systems have also been used in limited circumstances for collision avoidance. One such system is disclosed in U.S. Pat. No. 5,581,250 issued Dec 3, 1996, as applied to unmanned aerial vehicles (UAV). An object is sensed by a single forward-looking camera. If an object is sensed within the field of vision (i.e., straight ahead), then the airplane is on a collision course with the object. A stereo camera pair is then used to quantify the threat by measuring the distance to the obstacle. Obstacle detection is done only in two dimensions, based upon the twin assumptions that the direction of vehicle motion is along the optical axis of the camera, and that the object is a physical object having edges that are readily segmentable from the background. Such a system will not detect objects that are not directly ahead of the vehicle. Such a system will also provide poor performance for obstacles that are not readily segmentable from the background. Another disadvantage is that the UAV system is susceptible to errors when it cannot find a closed contour of an object. Also, the 2-D tracking of an object may be lost as the view of the 3-D object changes. Furthermore, the UAV system makes only a gross calculation of distance of the object from the center of the UAV, in complete disregard for the shape of the UAV itself. This prevents such a system from being used in situations where non-dangerous obstacles approach the vehicle closely.

SUMMARY OF THE INVENTION

The present invention provides a three-dimensional (3-D) obstacle detection system involving a method and apparatus for performing high-integrity, high efficiency machine vision. The machine vision obstacle detection system converts two-dimensional video pixel data into stereoscopic 3-D point data that is used for calculation of the closest distance from the vehicle to points on the 3-D objects, for any object within view of at least one imaging device configured to provide obstruction information.

According to the invention, the 3-D machine-vision obstacle detection apparatus includes an image acquisition device such as two or more video cameras, or digital cameras, arranged to view a monitored scene stereoscopically. This stereoscopic "target camera" is mounted on a target vehicle, i.e., the vehicle that will navigate without colliding with obstacles. The cameras in the target vehicle's target camera each pass the resulting multiple video output signals to a computer for further processing. The multiple video output signals are connected to the input of a video processor adapted to accept the video signals, such as a "frame grabber" sub-system. Video images from each camera are then synchronously sampled, captured, and stored in a memory associated with a general purpose processor. The digitized imaged in the form of pixel information can then be manipulated and otherwise processed in accordance with capabilities of the vision system. The digitized images are accessed from the memory and processed according to the invention, under control of a computer program. The results of the processing are then stored in the memory, or may be used to activate other processes and apparatus adapted for the purpose of taking further action, depending upon the application of the invention.

In further accord with the invention, the machine vision obstacle detection solution method and apparatus involves two phases of operation: training and run-time. In the training phase, the system gathers data regarding the target vehicle itself (defining a "target zone"). The system is trained to represent the vehicle itself, for use in calculating distances from the vehicle to obstacles later encountered. The training step may be implemented with an analytical characterization of the vehicle, referenced to the target camera. Alternatively, 3-D points of the target vehicle may be manually measured and input to the system, or a set of 3-D points of the target vehicle can be constructed from a reference camera having a known orientation to the target camera. Stereoscopic images of the vehicle are captured by a reference camera, digitized, and processed to create a set of 3-D points corresponding to the target vehicle.

During the run-time phase, performed after the training phase, an illustrative embodiment of the present invention uses the same image acquisition process to gather information about a monitored scene, and to determine 3-D information about entities in the monitored scene, i.e., surrounding the target vehicle. A set of run-time stereoscopic images from the target camera is processed for 3-D information about any entities in the monitored scene, and a set of run-time 3-D points is generated, corresponding to the entities seen. This additional object information can then be used for object recognition processing. The train-time 3-D points are then compared with the set of run-time 3-D points, and for each 3-D run-time point a result is generated that corresponds to a shortest distance vector from that point to the target vehicle. The shortest distance vector is then used in a thresholding analysis to classify the 3-D run-time points as target, obstacle or background. The 3-D run-time points could also be optionally clustered (3-D segmentation) to obtain information about objects. The system can also be used to capture multiple sequential inputs and then calculate a trajectory of the target vehicle with respect to the identified object(s), i.e., whether there is a collision course.

For example, if safe operation of the vehicle requires a signal or other action to be taken when an obstacle is directly in the path of the vehicle, the method and apparatus according to the invention might be configured to provide a result related to the position of the obstacle with respect to the vehicle. Furthermore, when an obstacle is found in a position that approaches the danger location, appropriate collision avoidance measures might also be triggered (change direction, apply brakes, etc). On the other hand, the system could recognize that the obstacle has a position that does not intrude upon the specified 3-D criteria used to define the target zone, and would therefore allow the vehicle to continue. Additional information can be collected over a series of time-sequenced frames and a trajectory can be estimated, e.g., the obstacle will be passed at a safe distance.

Features of the present invention include the ability to generate diverse real-time 3-D position information about 3-D entities in the viewed area. If an optional 3-D segmentation algorithm is used, then 3-D points may also be resolved into 3-D objects. Using the system according to the invention, distance from one object to another can also be calculated, allowing the obstacle detection system to enforce proximity rules. Multiple objects can be detected in positions that result in different output results for each object (e.g., alarm or not). The results can depend upon the 3-D position of the obstacle with respect to the target vehicle, based upon the 3-D data points detected for the obstacle. Results can also be measured in terms of distance between multiple obstacles. In addition to the foregoing applications, the 3-D output from the system can also be fed to an object recognition system that can be used to identify objects in the vehicle path, in addition to their position, shape and size.

Comparison of the target zone to an obstacle based on positional relationships between 3-D points and entities (e.g. near, far), and other safety-related 3-D information (e.g., object size, orientation), can be determined according to the invention. This information is obtained without using sensors that require active emissions of laser light, microwaves, or ultrasound. Since the system according to the invention is completely passive, multiple vehicles can operate in close proximity without interfering with each others' sensors. The system requires substantially less reliance on moving mechanical parts subject to the rigors of wear and tear.

Calculation of 3-D information about objects/entities observed in the obstacle detection solution according to the invention overcomes numerous disadvantages of the prior art by allowing safety rules to be defined based upon derivation of 3-D information about particular 3-D objects and their relative locations and orientations, not just the presence of some ambiguous difference within the scene being viewed (i.e., simple "motion" or "change"). It is not necessary for the vehicle configured according to the invention to approach very close to the obstacles, as would be necessary for the ultrasound and radar sensors. Machine vision systems offer a superior approach to obstacle detection by processing images of a scene to detect and quantify the objects being viewed according to their 3-D points, rather than simply by their two-dimensional location.

Other advantages of the invention are that it may be used to capture and process a series of several run-time images, and calculate a 3-D trajectory of the obstacle. This information may be very important for detecting the approach of the vehicle on a collision course with an obstacle. Another feature of the invention is the ability to display the obstacles, the target vehicle, and the shortest (minimum) distance vector. Another feature of the invention is the ability to automatically store (and archive) digitized images for later viewing of the scene in which an obstacle came dangerously close to the vehicle.

BRIEF DESCRIPTION OF THE DRAWINGS

These and other features of the present invention will be better understood in view of the following detailed description taken in conjunction with the drawings, in which.

DETAILED DESCRIPTION

Figure 1:
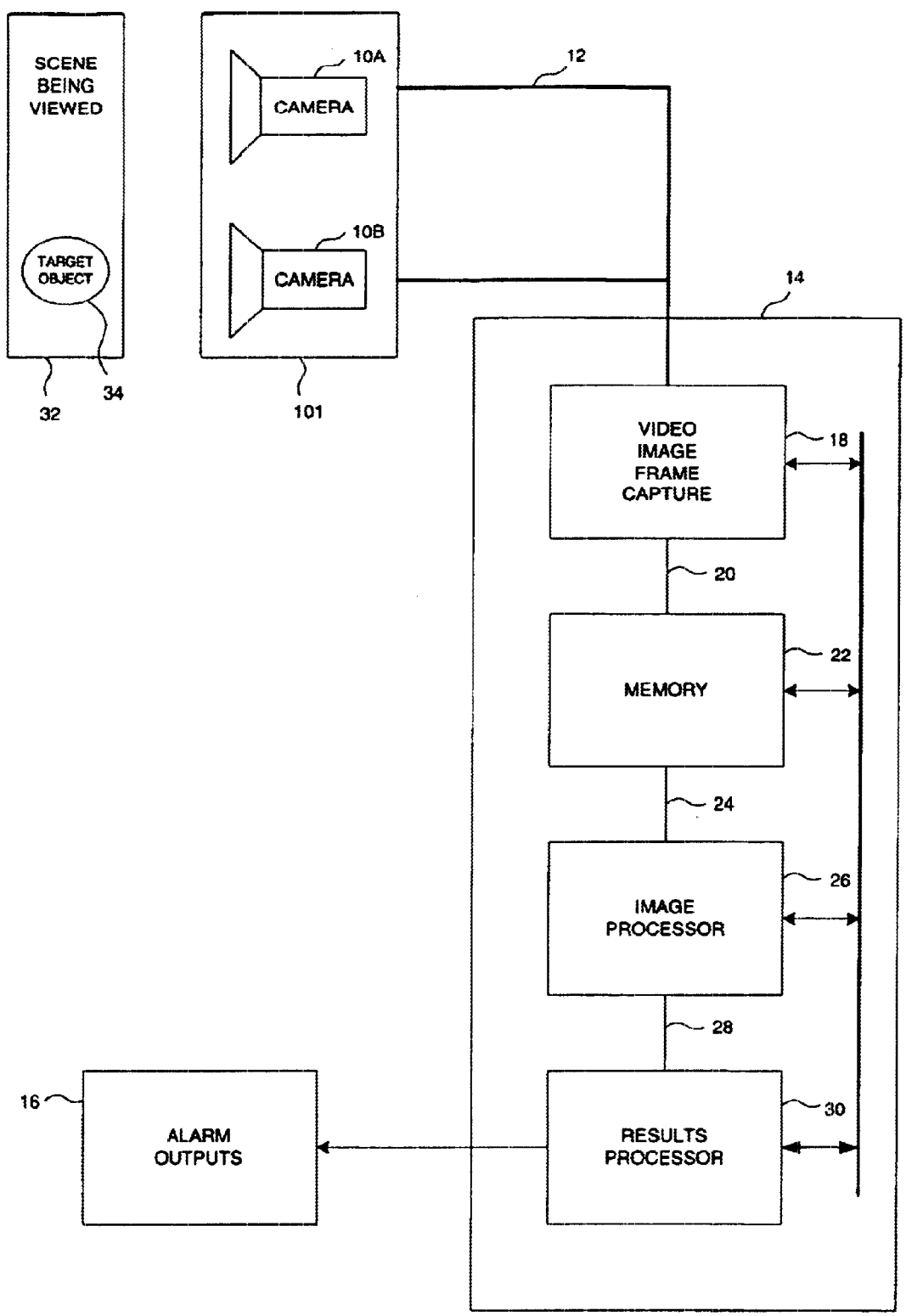
FIG. 1 is a functional block diagram of an obstacle detection system, according to the invention.

A vision system implemented in an obstacle detection embodiment according to the invention is illustrated in FIG. 1. The system incorporates an image acquisition device (e.g., a target camera head) 101, comprising at least two cameras 10a, 10b, such as the Triclops model available from Point Grey Research, Vancouver, B. C. The cameras 10a, 10b send a video signal via signal cables 12 to a video obstacle detection processor 14. The two cameras 10a, 10b are both focused on a scene 32 to be monitored. The video obstacle detection processor 14 includes a video image frame capture device 18, image processor 26, and results processor 30, all of which are connected to a memory device 22. Generally, digitized video image sets 20 from the video image capture device 18, such as a Cognex 8100 Multichannel Frame Grabber, available from Cognex Corp., Natick, Mass., or other similar device, are stored into the memory device 22. The image processor 26, implemented in this illustrative embodiment on a general purpose computer, receives the stored digitized video image sets 24 and generates a 3-D data set 28. The 3-D data set 28 is delivered to the results processor 30 which generates results data 32, as described in detail hereinafter. The results data 32 effect results as a function of the application, and may, for example, be fed to the alarm output 16.

Figure 2:
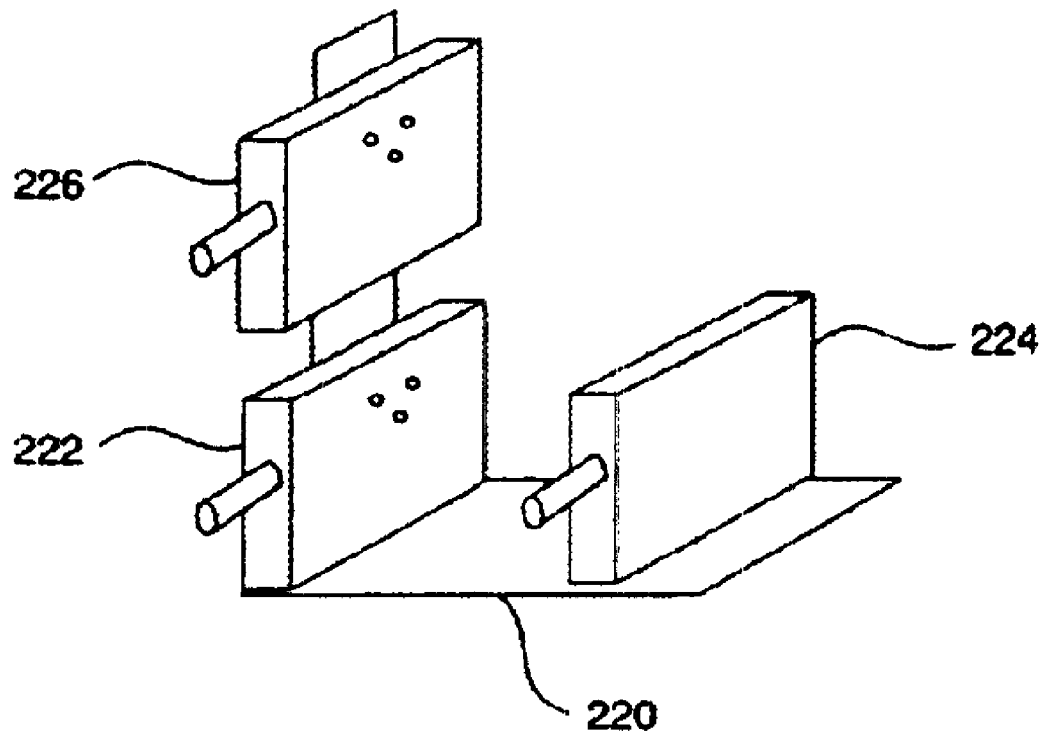
FIG. 2 is an illustration of a trinocular camera arrangement adapted for use in acquiring images for processing according to the invention.

The image acquisition device 101 in the illustrative embodiment comprises an arrangement, as illustrated in FIG. 2, for acquiring image information. In the illustrative arrangement, three cameras: a right camera 222, a left camera 224, and a top camera 226 are mounted on an L-shaped support 220, with two of the cameras, the left camera 222 and the right camera 224 side-by-side, forming a line, and the third, top camera 226 mounted out of line with the other two 222, 224.

An illustrative embodiment of the invention includes two phases of operation: a training phase and a runtime phase. During the training phase, a 3-D reference model of the target vehicle 602 (and its attachments) is constructed. During the run-time phase, the scene 32 is monitored by the target camera 604, and the 3-D features of objects 34 in the monitored scene 32 are extracted and compared to the 3-D reference model.

Figure 3:
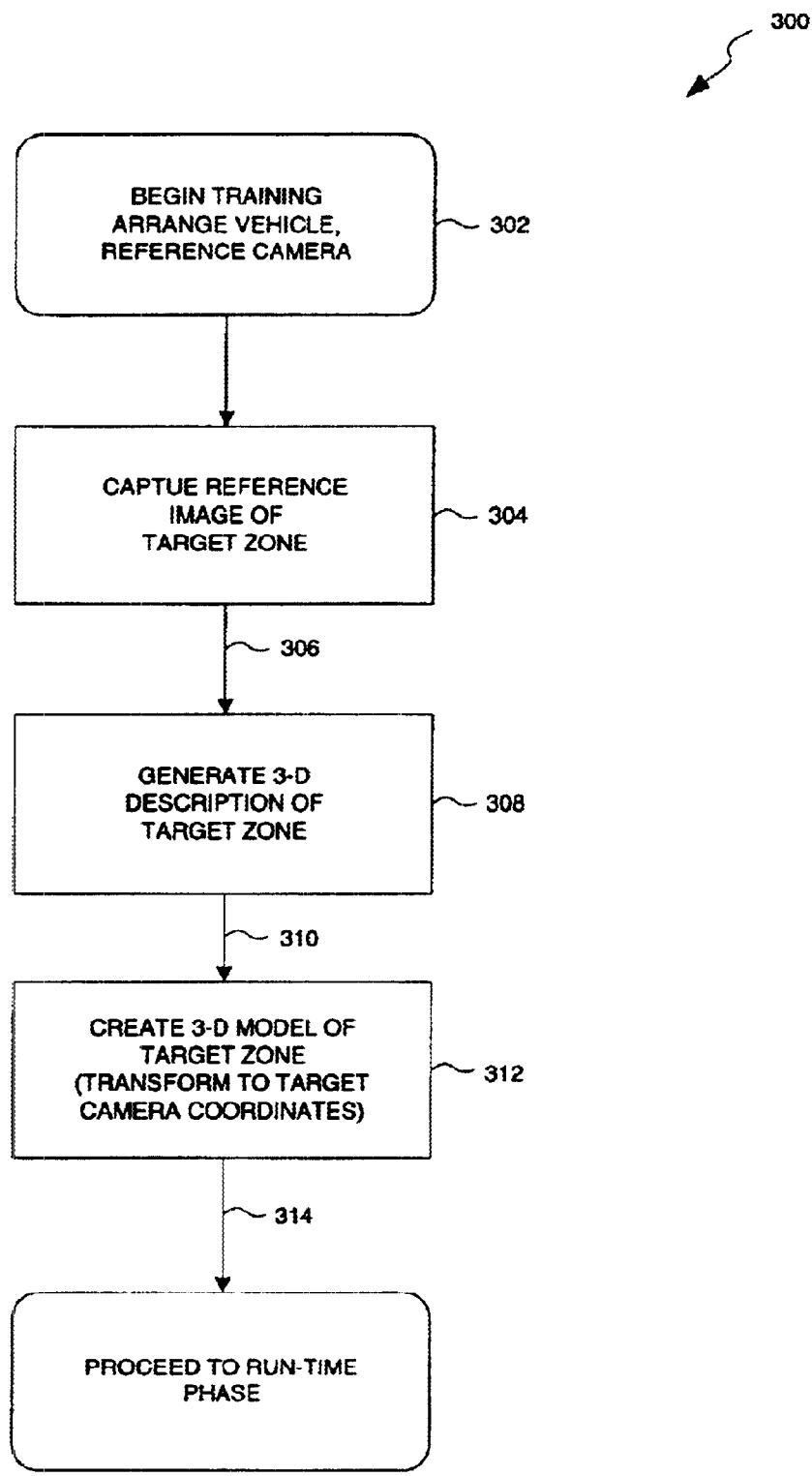
FIG. 3 is a flow diagram illustrating training of the obstacle detection system according to the invention.
Figure 4:
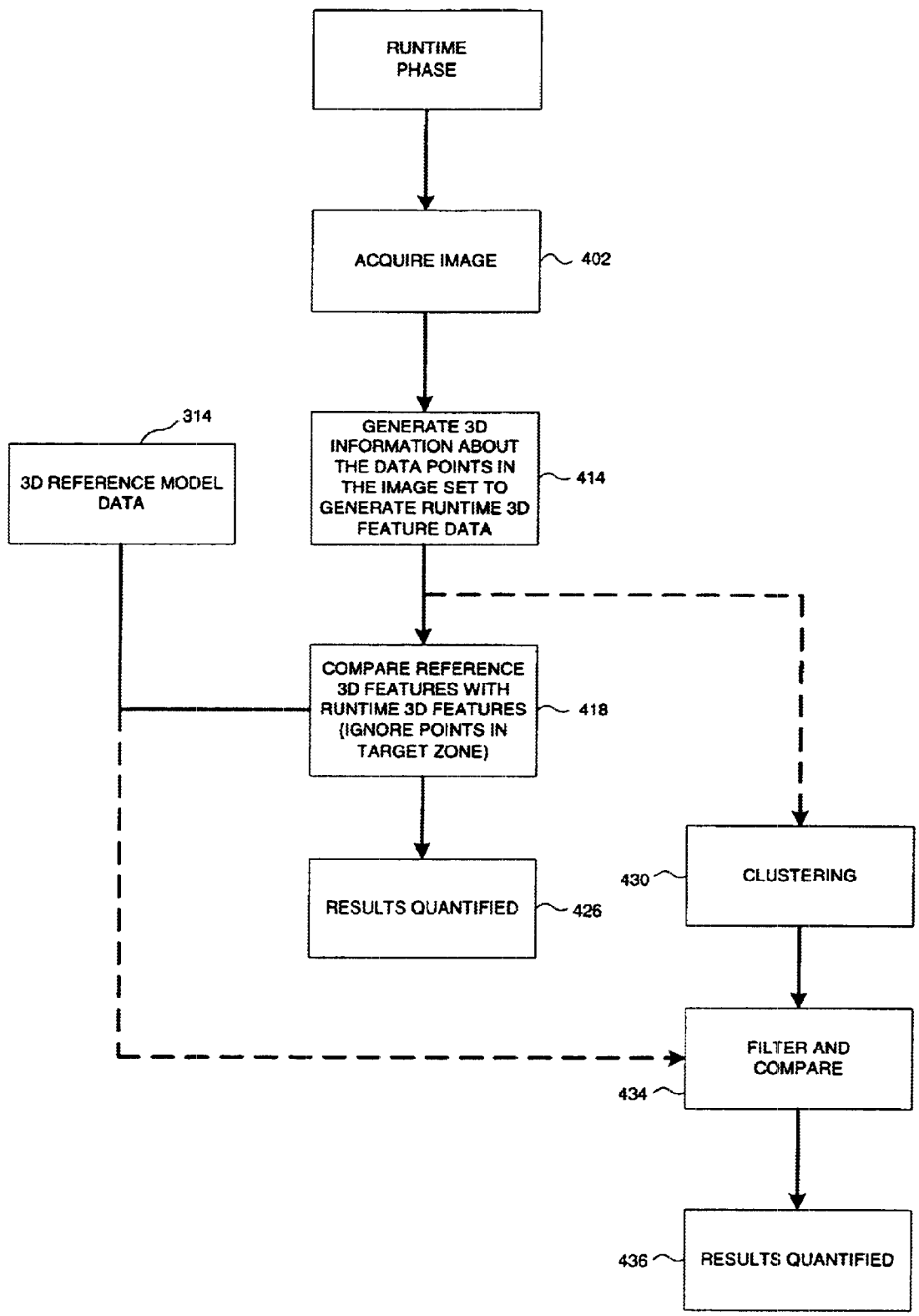
FIG. 4 is a flow diagram illustrating the run-time processing of video images according to the invention.

FIGS. 3 and 4 provide an overview of two separate phases of operation according to the invention: a train-time process 300 (FIG. 3), and a run-time process 400 (FIG. 4) which normally follows the train-time process. The training step could use a "target zone" that can be characterized analytically and which extends outwardly from the target camera head of the target vehicle. The training step can also use a set of points that are represented in the coordinate system relative to the target camera head. This can be done using something as primitive as a tape measure or something as sophisticated and accurate as another stereo camera system, i.e., the reference camera head. Basically any range finding (3-D measurement) system will do. The set of 3-D points correspond to the target zone. The methodology described hereinafter uses the reference camera, i.e., a second stereo camera head in addition to the target camera head.

Figure 5:
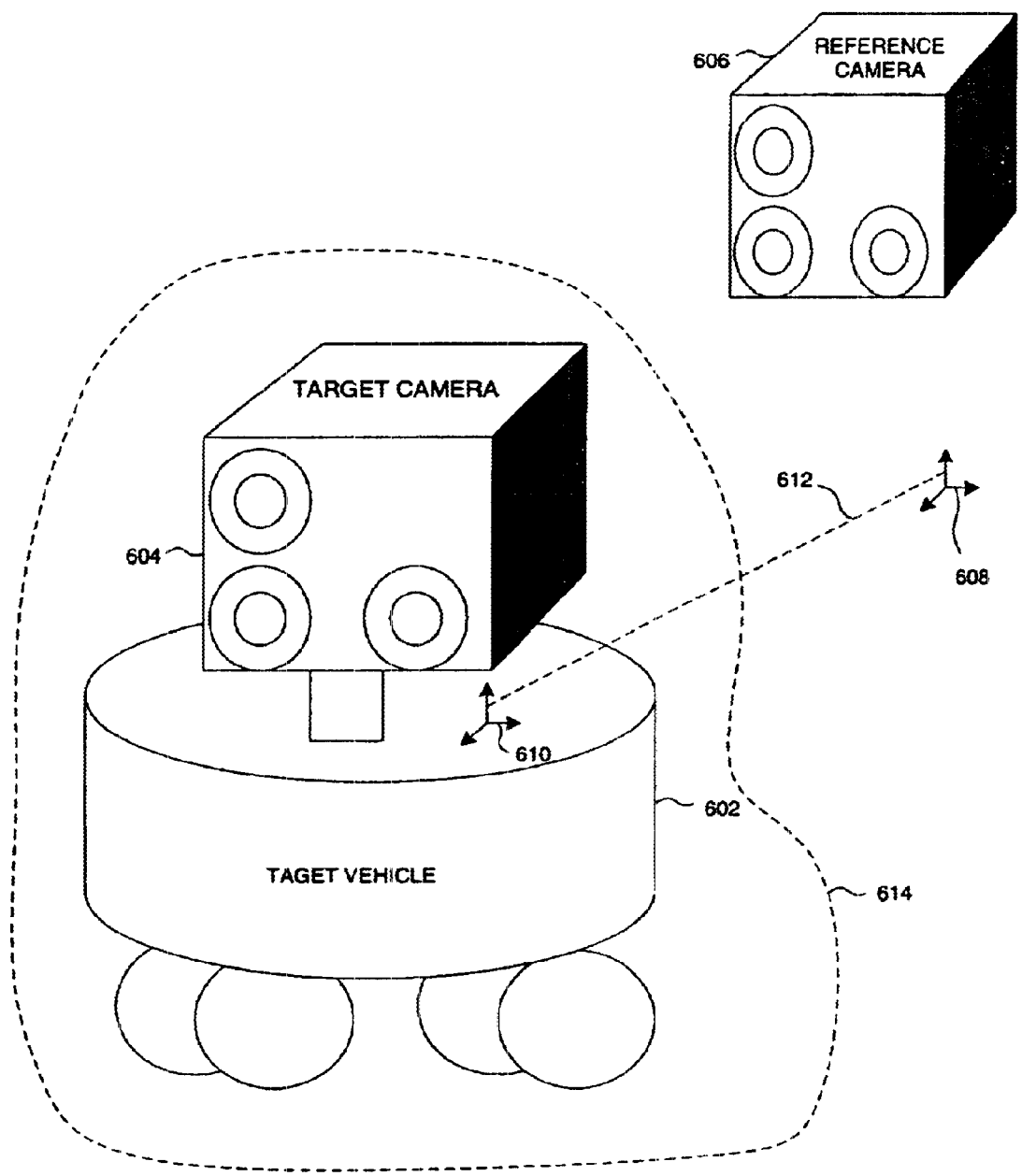
FIG. 5 is an illustration of a target vehicle, with a target camera and reference camera.

Referring now to FIG. 3, a first step 302 in the training process 300 requires an operator to arrange the target camera head 604 on the vehicle 602, as shown in FIG. 6. The target vehicle 602 which can move within the 3-D space around it, carrying the target camera head 604, is stationed in view of a reference camera 606, as shown in FIG. 5. A reference scene 32 (preferably neutral, and without other objects) containing the target or reference vehicle 602 is viewed by the reference camera 606 to establish a target. It should be appreciated that structured lighting, as known in the art, could be implemented in the scene during this arrangement step in order to optimize characteristics of the scene for imaging as a function of the application. This step also includes the calibration and adjustment of the focal length, baseline, focus and other parameters of the reference camera 606. An operator may observe the scene 32 through a viewfinder of the reference camera 606, and/or in temporary test images captured and displayed on a monitor (not shown) configured with the video image obstacle detection processor 14. The scene 32 can be adjusted to account for the texture and color of target vehicle 602 elements and background for generating useful/optimized images.

During training, it is assumed that the 3-D orientation 612 between the reference camera 606 and the target camera 604 is known. The relative orientation 612 may be obtained by the method described in Robot Vision, by Berthed Klaus Paul Horn (The MIT Press, McGraw-Hill Book Company). The 3-D features of the target vehicle 602 detected by the reference camera 606 are then used to transform the 3-D points from a reference coordinate system 608 used by reference camera 606 into a target coordinate system 610 used by target camera 604. The transform is based upon the relative orientation 612 between target camera 604 and reference camera 606.

The next step 308 of the training phase 300 is to generate a 3-D description 310 of the scene 32, and more specifically, of the target vehicle 602. Since a reference data set 306 contains images digitized from multiple cameras 222, 224, 226 at substantially the same instant, stereoscopic processing of the reference image set 306 results in the computation of 3-D information (i.e., location) in the form of a set of 3-D points that correspond to an edge or other boundary of the object 34 in the monitored scene 32. Reference image sets 306 are stereoscopically processed pair-wise, whereby the digitized image from the left camera 222 and right camera 224 are processed, and the digitized images of the top camera 226 is processed with the digitized image of the right camera 222. By combining the 3-D data derived from these two sets of pair-wise processing results, the illustrative embodiment of the invention obtains a set of 3-D data points 310 for the object(s) 34 in the scene 32. It should be noted that if the embodiment is implemented with only a pair of horizontally arranged cameras, then the 3-D information on horizontal features will be poor or non-existent.

Once a set of 3-D data points 310 has been generated, the illustrative embodiment proceeds to the step 312 of creating a 3-D model 314 of the object in the scene during the training phase, i.e., the target vehicle 602, or portions thereof. The 3-D points are obtained only at the boundaries of the objects and these 3-D boundary points are called "3-D features." Boundary points include the occlusion boundaries due to surface discontinuities, as well as the texture boundary points observed due to texture of a surface. Specific 3-D features may be derived by any of several well-known edge segmentation processes, described in Digital Image Processing, by R. Gonzalez and P. Wintz, (2d Ed., Addison-Wesley Publishing Company), which is incorporated-herein by reference, followed by a stereo algorithm, such as described in Structure From Stereo—A Review, Dhond, Umesh R, and Aggarwal, J. K., IEEE Transactions On Systems Man. And Cybernetics, Vol. 19, No, 6, November/December 1989, which is incorporated herein by reference. A generalized representation of an object 34 will always be possible by defining a set of three-dimension data points 310, if not chains of points, or other 3-D features.

As a further step of the training phase 300, the 3-D model 314 created for the reference object 34 has additional parameters associated with it, such as tolerance parameters and other parameters that control the generation of train-time features and run-time features. Other generic parameters can also be included, such as those related to the obstacle detection mission of the system (e.g., the location of 3-D zones in which objects are permitted or prohibited, relative severity of hazards in each such zone, etc). The information collected in the training phase 300 comprises the reference image of the target zone 306, the 3-D model 314 and the corresponding set of parameters. The result of the train-time processing is a 3-D reference model of the target vehicle 602 and corresponding parameters. The reference model is the description of the target zone 614, including the target vehicle 602 or portions thereof, in 3-D in the coordinate system 610 of the target camera head 604. The reference model is stored in memory 22 in preparation for comparison with run-time data representing the target/objects found in the scene 32 at run-time, as described in detail hereinafter.

It should be appreciated that an operator/technician may also manipulate the train-time reference model to include or exclude selected 3-D points or even 3-D objects. If all desirable points of the vehicle can't be seen in a single reference view, it is possible to use several different camera heads, or a single reference camera head could be moved around the vehicle, or the vehicle could be moved in phases around a stationary reference camera head. In such cases it is desirable to get a union of the sets of image data representing the train-time vehicle.

It should be further appreciated that if a target zone 614 of the target vehicle 606 under consideration can be represented in analytical form, then the corresponding equation can also be used to calculate a set of 3-D points (e.g., a cylinder that would enclose all 3-D points of the target vehicle 602 and target camera 604). Such an equation (and any necessary relative orientation step) can also be used directly for the 3-D reference model during run-time, as further described below.

Referring now to FIG. 4, after a 3-D model 314 has been generated in the training phase 300 (or through multiple training phases for multiple cameras); the illustrative embodiment is ready to enter the run-time phase 400. During run-time, the vehicle is navigating in its environment. The goal of the method and apparatus in the-illustrative embodiment according to the invention is to automatically detect obstacle information that can be interpreted, for example, to output the desired alarm conditions.

During runtime a runtime image is acquired 402, and runtime 3-D features are extracted from the acquired image. The 3-D points are obtained only at the boundaries of the objects and these 3-D boundary points are called "3-D features." Again, specific 3-D features may be derived by any of several well-known edge segmentation processes, described in Digital Image Processing, by R. Gonzalez and P. Witness, (2d Ed., Addison-Wesley Publishing Company), which is incorporated herein by reference, followed by a stereo algorithm, such as described in Structure From Stereo—A Review, Droned, Mesh R, and Aggarwal, J. K., IEEE Transactions On Systems Man, And Cybernetics, Vol.

19, No, 6, November/December 1989, which is incorporated herein by reference.

Generation 414 of the 3-D runtime features 416 includes the same type of pair-wise stereoscopic processing of the runtime image set 412 as was done for the training phase as described hereinbefore. Further processing of the stereoscopic data generates the 3-D runtime features 316, in the same way that the 3-D reference model was generated 314 in training time.

The 3-D runtime features are then compared 418 to the 3-D reference model 314 generated in the training phase 300. A result is calculated 424 for each run-time point in this comparison step 418. The result corresponds to a shortest distance vector from a respective run-time point, to the target vehicle. The calculated result 424 is then quantified 426 with respect to the 3-D reference model 314 and its corresponding reference parameters 316. The step of results quantification 426 involves the measurement of the calculated result 424 found in the comparison step 418, and use of quantification, such as by classification of the type of difference (e.g., 3-D position). The results quantification step 426 in this illustrative embodiment includes evaluation of threshold parameters that determine whether a feature belongs to the target vehicle 602 (or the target zone 614), or to an obstacle, or to the background.

Features can be divided, by thresholding, into these three categories: target, obstacle, or background. Target points correspond to portions of the target vehicle 602, or any other points within an analytically defined target zone 614, which must not be mistaken for obstacles. It is possible that some portion of the target may actually be visible to the target camera head 604 itself in which case these portions must be ignored and not mistaken for the obstacle. Basically all features within the target zone are ignored, where the defined target zone is a 3-D zone such that any point within it is less than a fixed threshold value from any arbitrary 3-D point on the target (i.e., a train-time feature). Obstacles are those features that fall in a "guard zone." The guard zone is an imaginary 3-D zone such that any point within it is less than a fixed threshold value from any arbitrary 3-D point on the target (train-time feature) which does not belong to the target zone 614. Background features correspond to other features that are not derived from obstacles or the target zone 614, and which correspond to the background of the scene which is being imaged.

In an illustrative embodiment, the run-time points are organized as chains (connected boundary points). A loop is executed through the chains and the various features on the chain and for each run-time feature the nearest target point (i.e., train-time feature) is computed. Run-time points are divided into three sets: belonging to the target zone 614, guard zone, or background. A runtime point is said to belong to the target if it is less than a certain threshold distance (called the target zone). A runtime point is said to belong to an obstacle if it is greater than or equal to the target zone distance and less than a certain threshold distance (called the guard zone). If a minimum number of contiguous run-time features satisfy the obstacle test (i.e., are found in the guard zone), then it is considered to be an obstacle. This type of system produces a result that is true or false, i.e., if there is an obstacle or not. Such an implementation can be divided further to provide multi-tiered outputs where the computed distances between the obstacle and the nearest target feature (i.e., point on the target vehicle 602), or within the immediate vehicle trajectory, can be compared to several zones which have mutually exclusive preset ranges or boundaries, and desired outputs are stored for each zone.

As previously mentioned, where the target zone 614 can be depicted analytically, the topological formulation of the target area 614 can be used directly during the run-time phase. Rather than generate and compare 3-D points from the training phase, the formula of the target zone 614 can be used to calculate the 3-D distance of run-time entities to the target zone 614.

Although the illustrative embodiment is described herein as including a method and apparatus where the calculated result 424 is a 3-D distance between two sets of points, as an additional option 430 of FIG. 4, a set of 3-D objects can also be generated through the process of "clustering" of the runtime 3-D data points into "clouds" that correspond to one 3-D object or another in the runtime scene 32. Any of various clustering algorithms can be implemented to produce the clouds of 3-D data points corresponding to respective 3-D objects in the scene, such as described in Duda, Richard and Hart, Peter, "Pattern Classification and Scene Analysis," Chap. 6, Pp. 189–256, Wiley Interscience Publications, Wiley & Sons, which is incorporated herein by reference. Once a set of runtime objects 432 has been generated, some amount of filtering and comparison 434 is done to detect obstacles, and the results quantified 436. Additional object analysis could be done, as part of quantifying the results, based upon the object attributes (e.g., size, shape). Similarly, these runtime object results could be used in further sophisticated object recognition algorithms.

As another alternative, an object can be tracked through successive frames captured during successive runtime comparisons. This type of temporal filtering could provide information such as a filtered distance, relative velocity, or trajectory. Velocity and location parameters can then be used, in a process known as "trajectory computation," to identify the desired alarm conditions. For example, an obstacle on a collision course with the target vehicle 602 may trigger an alarm, but an object moving in a different direction would not.

Although the invention is described with respect to an identified method and apparatus for image acquisition, it should be appreciated that the invention may incorporate other data input devices, such as digital cameras, CCD cameras, video tape or laser scanning devices that provide high-resolution two-dimensional image data suitable for 3-D processing.

Similarly, it should be appreciated that the method and apparatus described herein can be implemented using specialized image processing hardware, or using general purpose processing hardware adapted for the purpose of processing data supplied by any number of image acquisition devices.

Furthermore, although particular divisions of functions are provided among the various components identified, it should be appreciated that functions attributed to one device may be beneficially incorporated into a different or separate device. Similarly, the functional steps described herein may be modified with other suitable algorithms or processes that accomplish functions similar to those of the method and apparatus described.

Although the invention is shown and described with respect to an illustrative embodiment thereof, it should be appreciated that the foregoing and various other changes, omissions, and additions in the form and detail thereof could be implemented without changing the underlying invention.

What is claimed is:

1. A method of implementing a machine vision system to detect an obstacle in a viewed scene, said method comprising the steps of:

developing a 3-D reference model of a vehicle, said reference model including a set of 3-D reference points;

acquiring a runtime version of said viewed scene, said runtime version including a set of 3-D runtime points;

comparing said set of 3-D reference points to said set of 3-D runtime points; and classifying said set of 3-D runtime points as obstacle, target or background as a function of a result of said comparing step.

2. The method of claim 1 in which said step of developing a 3-D reference model further comprises the steps of:

collecting stereoscopic images of a reference scene containing said vehicle during a training phase;

processing said stereoscopic images for stereoscopic information about said vehicle within the reference scene to develop said set of 3-D reference points.

3. The method of claim 1 in which said step of acquiring said runtime version of said viewed scene further comprises the steps of:

collecting a plurality of images of said viewed scene in a runtime phase;

processing said plurality of images for stereoscopic information about any entity within the viewed scene to determine said set of 3-D runtime points.

4. The method of claim 1 wherein the step of comparing includes generating an output corresponding to a 3-D position of any said obstacle relative to said 3-D reference model.

5. The method of claim 4 in which said step of generating said output corresponding to said 3-D position of any said obstacle further comprises the steps of:

calculating a shortest distance between each 3-D point of said obstacle and 3-D points of said 3-D reference model; and determining whether said shortest distance is less than a predetermined threshold distance.

6. The method of claim 1 wherein the step of acquiring a run-time version involves processing said set of 3-D runtime points using a clustering algorithm to generate a set of 3-D objects.

7. A method of implementing a machine vision system to compare a model of a 3-D reference vehicle in a reference scene to a runtime scene, said method comprising:

storing information related to said model of said 3-D reference vehicle, said model including information related to said 3-D reference vehicle;

acquiring information related to said runtime scene;

processing said information related to said runtime scene to form stereoscopic information including a set of 3-D points related to said runtime scene;

comparing said information related to said 3-D reference vehicle with said set of 3-D points related to said runtime scene; and defining any 3-D entity in said runtime scene as one of the 3-D reference vehicle, an obstacle, or background.

8. The method of claim 7 in which said information related to said 3-D reference vehicle is one of an analytical description and a set of 3-D points related to said 3-D reference vehicle.

9. The method of claim 7 in which said step of storing information related to said model of said 3-D reference vehicle further comprises the steps of:

collecting stereoscopic images of said 3-D reference vehicle during a training phase; and processing said stereoscopic images for stereoscopic information to develop a set of 3-D points corresponding to the 3-D reference vehicle.

10. The method of claim 7 in which said step of acquiring information related to said runtime scene further comprises the step of:

collecting a plurality of successive images of said runtime scene in a runtime phase.

11. The method of claim 7 in which the step of comparing further comprises the step of:

calculating a 3-D distance from said 3-D reference vehicle to each said obstacle.

12. The method of claim 7 further including the step of generating an output corresponding to a 3-D position of any said obstacle relative to said 3-D reference vehicle.

13. The method of claim 12 in which said step of generating said output corresponding to said 3-D position of any said obstacle further comprises the steps of:

calculating a shortest distance between each 3-D point of said obstacle and 3-D points of said 3-D reference model; and determining whether said shortest distance is less than a predetermined threshold distance.

14. The method of claim 7 in which said step of storing information related to said model of said 3-D reference vehicle further comprises the steps of:

focusing a stereoscopic camera on said reference scene;

collecting a substantially synchronous plurality of frames of video of said reference scene;

digitizing said plurality of frames to create a set of digitized frames forming said information related to said model.

15. The method of claim 7 in which said step of acquiring information related to said runtime scene further comprises the steps of:

focusing a stereoscopic camera on said runtime scene;

collecting a substantially synchronous plurality of frames of video of said runtime scene;

digitizing said plurality of frames to create a set of digitized frames forming said information related to said run-time scene.

16. The method of claim 15 further comprising the steps of:

storing said set of digitized frames in a memory; and repeating said collecting, digitizing and storing steps for each of a plurality of runtime scenes.

17. The method of claim 7 wherein the step of processing said information related to said runtime scene involves processing said set of 3-D points using a clustering algorithm to generate a set of 3-D objects related to said runtime scene.

18. A machine vision apparatus to detect an obstacle in a viewed scene, comprising:

an image acquisition device;

a processor including, means for developing a 3-D reference model of a vehicle including a set of 3-D reference points, means for acquiring a runtime version of said viewed scene including a set of 3-D runtime points;

means for comparing said set of 3-D reference points to said set of 3-D runtime points; and means for classifying said set of 3-D run-time points as obstacle, target or background as a function of output from said means for comparing.

19. The apparatus of claim 18 further comprising means for processing said set of 3-D runtime points using a clustering algorithm to generate a set of 3-D objects.

* * * * *